(No Model.)
E. B. DANIELS.
SULKY PLOW.
No. 249,020. Patented Nov. 1, 1881.
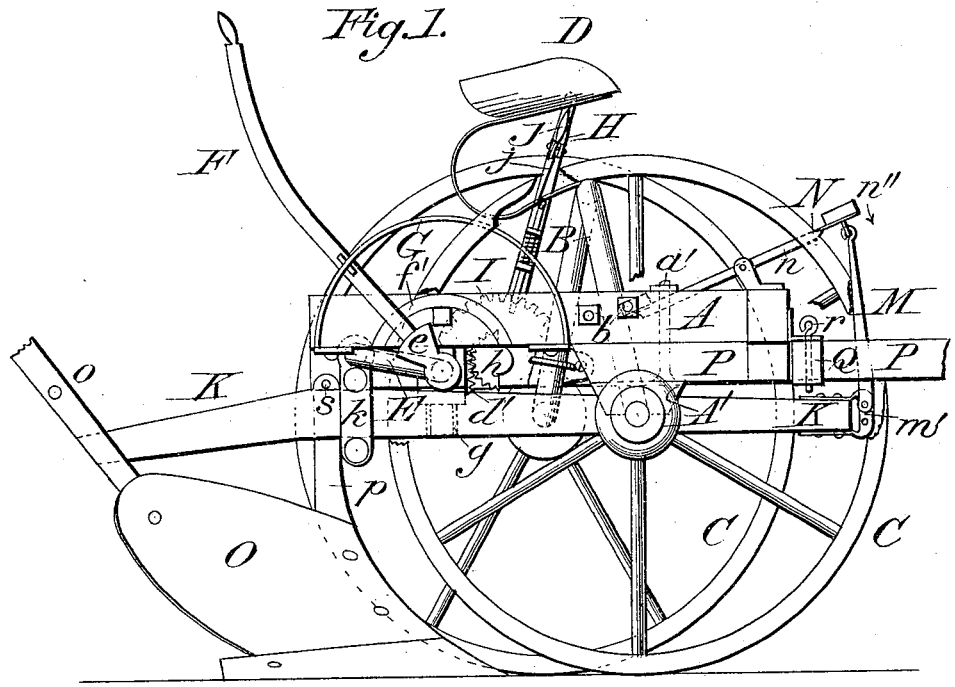
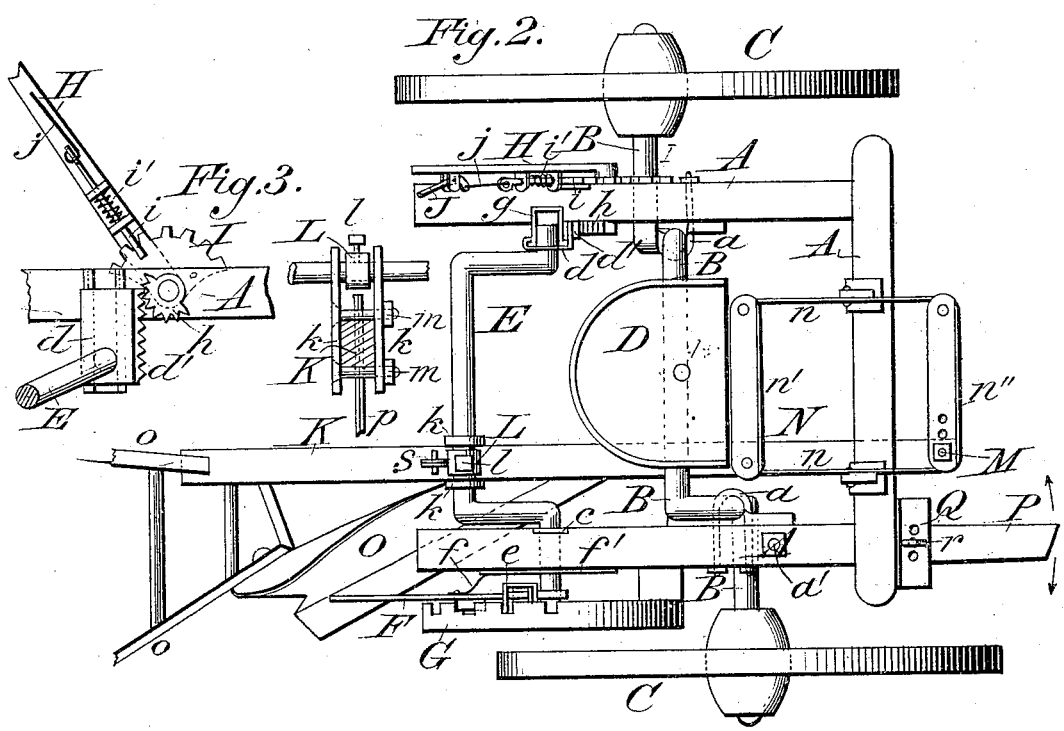
Witnesses:
F. H. Schott
A. R. Brown
Inventor
Ebenezer B. Daniels
Per C. H. Watson & Co. Attorneys.

UNITED STATES PATENT OFFICE.

EBENEZER B. DANIELS, OF LIBERTY TOWNSHIP, TIOGA COUNTY, PA.

SULKY-PLOW.

SPECIFICATION forming part of Letters Patent No. 249,020, dated November 1, 1881.

Application filed March 24, 1881. (No model.)

*To all whom it may concern:*

Be it known that I, EBENEZER B. DANIELS, of Liberty township, in the county of Tioga and State of Pennsylvania, have invented certain new and useful Improvements in Sulky-Plows; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain new and useful improvements in sulkies for plows; and it consists in the construction and arrangement of parts, as hereinafter more fully described and claimed.

In the annexed drawings, Figure 1 is a side elevation. Fig. 2 is a plan view, and Fig. 3 is a detail.

A represents the frame of a plow-sulky, which is preferably made with three sides only, as shown in Fig. 2.

B is the bent axle, to which the wheels C C are attached. This axle is bent so that one of its arms inclines to the rear and the other to the front, and is secured to the frame A by means of screw-threaded clamps or eyebolts $a$ and nuts $b$. The bent axle supports the seat D, which is attached thereto in any convenient manner.

To the frame A is attached the bail or crankshaft E, which is journaled on one side of the frame in a stationary bearing, $c$, and on the opposite side in a vertically-sliding plate, $d$. At that end of the bail which is journaled in the fixed bearing $c$ is attached a guide stirrup or strap, $e$, which acts as a fulcrum for the lever F, which it also holds in place upon the bail. The pawl-lever F engages by means of a spring, $f$, attached to its inner side, with a rack, G, that is secured to the side of the frame A, and thus holds the bail E in the desired position. Being attached loosely to the bail E, the lever F, when engaged with the rack G, is allowed sufficient play to prevent strain of the parts while passing the plow through rough ground. The lower end of the spring $f$ bears against a curved plate, $f'$, which is let into the frame A and protects it from wear.

The sliding plate $d$, in which is journaled the opposite end of the bail E, is attached to a vertical guide, $g$, which is secured to the inner side of the sulky-frame. This sliding plate is provided on its front edge with a straight rack, $d'$, that engages with a segmental rack, $h$, on a short shaft, which passes through the frame A and carries at its outer end a lever, H. The lever H is provided on its inner side with bearings for a spring-pawl, $i$, that engages, by means of the spiral spring $i'$, with a rack, I, that is secured to the frame. The spring-pawl $i$ is connected by a loop, $j$, with a pivoted handle, J, that is attached to the upper part of the lever H, and by means of which the pawl $i$ may be disengaged from the rack I. It will be seen that by means of the lever H and spring-pawl $i$ the sliding plate $d$ may be operated so as to raise or lower the bail E or hold it in the desired position.

The bail E supports the rear end of the plow-beam K, which is attached thereto by means of the adjustable straps or bearings $k\ k$. An adjustable collar, L, is placed on the bail between the straps $k\ k$, and holds them in place at any desired point upon the bail by means of a set-screw, $l$. The straps $k\ k$ are connected by the bolts and nuts $m\ m$, by removing which the plow-beam K may be detached.

At its forward end the plow-beam K is provided with a clevis, $m'$, that is connected by the adjustable rod M with a foot-rest, N, which consists of the side levers, $n\ n$, that are pivoted in suitable bearings attached to the front of the frame A, and connected at their ends by the cross-bars $n'\ n''$. By pressing with the foot upon the rear cross-bar, $n'$, the end of the beam K is raised, thus lifting the point of the plow out of the ground, while by pressing upon the front bar, $n''$, the plow-point is depressed and held in the soil. The front cross-piece, $n''$, is provided with several perforations for the attachment of the eyebolt that secures the upper end of the rod M, and the clevis $m'$ at the end of the plow-beam K is also provided with a number of similar perforations for the passage of the bolt or pin that secures the lower bifurcated end of the connecting-rod. It will thus be seen that the rod M may be adjusted laterally according to the position of the beam K upon the bail E, and also with reference to the height of the plow-beam and its inclination, as may be desired.

The plow O is attached to the beam K by means of the handles o o and by the standard p, which is secured to the beam by the staple and pin s.

On one side of the sulky and secured to the axle B is a block, A', between which and the frame A above is pivoted, by means of a bolt, a', the tongue or pole P. This tongue swings laterally in a loop or guide-bracket, Q, which is provided with several perforations at the top and bottom for the passage of a pin, r, that passes through a slot or opening in the tongue, and thus holds it securely in the desired position.

The adjustable connection of the beam K with the bail E and foot-lever N renders the sulky adapted to the attachment of plows having beams of different heights, and enables the operator to readily adjust the beam in the required position. By pressure of the foot upon the front or rear of the lever-frame N the driver can hold the plow-point into the ground or raise the same to avoid obstructions, while by means of the levers F and H, at his right and left hand, respectively, the plow can be raised or lowered and quickly leveled to conform to the inequalities of the ground with ease and certainty.

Having thus described my invention, what I claim as new, and desire to secure by Letters Patent, is—

1. The combination of the frame A, plow-beam K, having clevis m', centrally-pivoted foot lever or frame N, and adjustable connecting-rod M, substantially as set forth.

2. The combination, with the frame A and plow-beam K, of the bail E, having fixed bearing c at one end and the notched sliding block d at the other end, the lever H, with toothed segment h, and the lever F, loosely attached to its socket on the bail to allow limited rise of the plow when the lever is locked, all substantially as shown and described.

In testimony that I claim the foregoing as my own I have hereto affixed my signature in presence of two witnesses.

EBENEZER B. DANIELS.

Witnesses:
WM. FOULKROD,
P. W. SCHIEK.